United States Patent
Ni et al.

(10) Patent No.: US 11,005,658 B2
(45) Date of Patent: May 11, 2021

(54) DATA TRANSMISSION SYSTEM WITH SECURITY MECHANISM AND METHOD THEREOF

(71) Applicant: DELTA ELECTRONICS, INC., Taoyuan (TW)

(72) Inventors: Wan-Sheng Ni, Taoyuan (TW); Wen-Yu Chuang, Taoyuan (TW); Hao-Chieh Chang, Taoyuan (TW); Edwin Lupito Loe, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 218 days.

(21) Appl. No.: 16/218,507

(22) Filed: Dec. 13, 2018

(65) Prior Publication Data

US 2019/0182045 A1 Jun. 13, 2019

Related U.S. Application Data

(60) Provisional application No. 62/598,215, filed on Dec. 13, 2017.

(30) Foreign Application Priority Data

Jul. 2, 2018 (TW) ................................. 107122775

(51) Int. Cl.
*H04L 29/06* (2006.01)
*H04L 9/32* (2006.01)
*H04L 9/08* (2006.01)

(52) U.S. Cl.
CPC .............. *H04L 9/321* (2013.01); *H04L 9/083* (2013.01); *H04L 9/0822* (2013.01); *H04L 9/0825* (2013.01); *H04L 9/0827* (2013.01)

(58) Field of Classification Search
CPC ..... H04L 9/321; H04L 9/0825; H04L 9/0822; H04L 9/0827
See application file for complete search history.

(56) References Cited

U.S. PATENT DOCUMENTS 7,242,772 B1 7/2007 Tehranchi
8,559,631 B1 * 10/2013 Waters .................. H04L 9/3073
380/28

(Continued)

FOREIGN PATENT DOCUMENTS

| CN | 106972927 A | 7/2017 |
|---|---|---|
| KR | 10-1541165 B1 | 8/2015 |
| TW | 510107 B | 11/2002 |

*Primary Examiner* — Harunur Rashid
(74) *Attorney, Agent, or Firm* — CKC & Partners Co., LLC

(57) ABSTRACT

A transmission system includes a first security unit coupling to application ends, a second security unit coupling to a user end, and a server. The server sends a first attribute key to the first security unit based on attributes of the application ends and sends a second attribute key to the second security unit based on attributes of the user end. To enable one application end, the first security unit encrypts a session key with the first attribute key, opens a socket, and sends the encrypted session key to the server. When the second security unit receives a request for the application end, the server sends the encrypted session key to the second security unit. The second security unit decrypts the encrypted session key with the second attribute key and connects to the socket. The second security unit interchanges information with the first security unit via the session key.

8 Claims, 3 Drawing Sheets

(56) References Cited

U.S. PATENT DOCUMENTS

| | | |
|---|---|---|
| 9,734,355 B2 | 8/2017 | Oxford |
| 10,769,295 B2 * | 9/2020 | Loza ................... G06F 21/602 |
| 2011/0231650 A1 * | 9/2011 | Coulier .............. H04L 63/0869 |
| | | 713/151 |
| 2015/0295713 A1 * | 10/2015 | Oxford ................ H04L 9/3242 |
| | | 713/171 |
| 2016/0155106 A1 * | 6/2016 | Streuter ............. G06F 3/04886 |
| | | 705/25 |

* cited by examiner

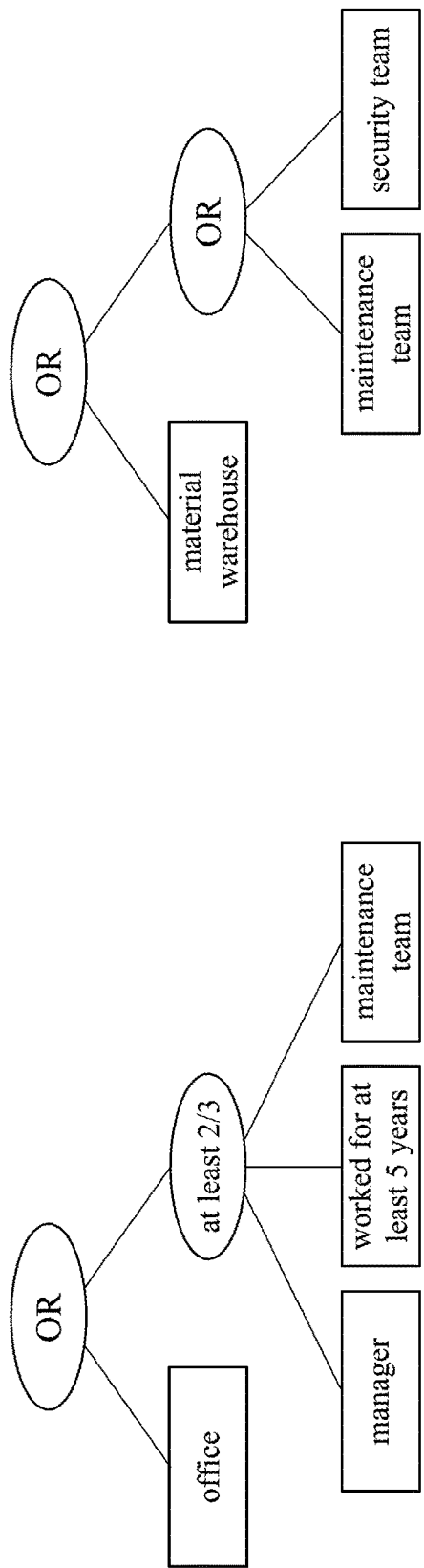
Fig. 3A
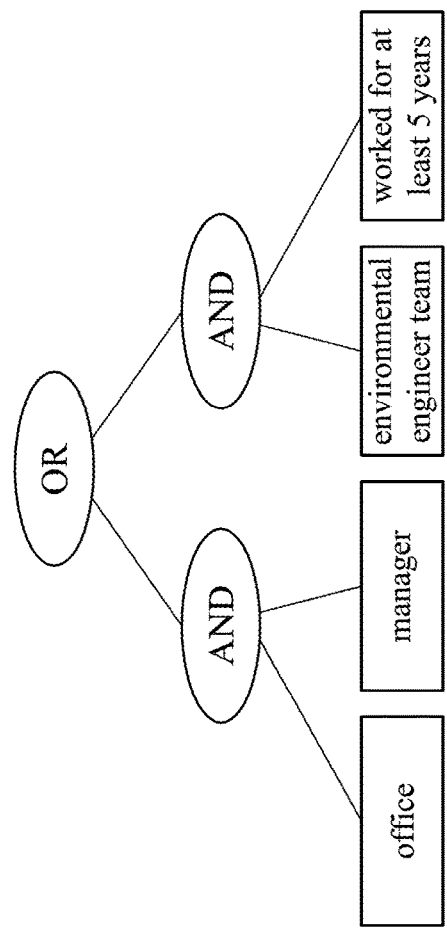
Fig. 3B
Fig. 3C

DATA TRANSMISSION SYSTEM WITH SECURITY MECHANISM AND METHOD THEREOF

RELATED APPLICATIONS

This application claims priority to U.S. Provisional Application Ser. No. 62/598,215, filed on Dec. 13, 2017, which is herein incorporated by reference. This application also claims priority to Taiwan Application Serial 107122775, filed on Jul. 2, 2018, which is herein incorporated by reference.

BACKGROUND

Technical Field

Present disclosure relates to a transmission system and method. More particularly, present disclosure relates to data transmission system and method with security mechanism.

Description of Related Art

Due to the rapid development of network technology, nowadays, information in daily life is mostly transmitted via networks. Therefore, to prevent information leakage in a data transmission progress, various information security systems are developed to provide protection to the data transmission.

SUMMARY

An aspect of present disclosure is to provide a transmission system with security mechanism. The transmission system comprises a first security unit, a second security unit, and a server. The first security unit is coupled to at least one application end. The second security unit is coupled to a user end. The server is coupled to the first security unit and the second security unit. The server is configured to assign a first attribute key to the first security unit according to at least one application attribute of the at least one application end and assign a second attribute key to the second security unit according to a user attribute of the user end. The server enables a first application end of the at least one application end, and the first security unit encrypts a first session key with the first attribute key and open a first socket, and the first security unit then transmits the encrypted first session key to the server. The first socket is provided to connect to the first application end. The second security unit receives a request from the user end for accessing the first application end, and the server transmits the encrypted first session key to the second security unit. The second security unit decrypts the encrypted first session key with the second attribute key to connect to the first socket, and the second security unit interchanges information with the first security unit according to the first session key.

Another aspect of present disclosure is to provide a transmission method with security mechanism. The transmission method is applied on a first security unit, a second security unit and a server. The first security unit is coupled to at least one application end, the second security unit is coupled to a user end, and the server is coupled to the first security unit and the second security unit. The transmission method comprises following steps: assigning, by the server, a first attribute key to the first security unit according to at least one application attribute of the at least one application end; assigning, by the server, a second attribute key to the second security unit according to a user attribute of the user end; when the server enables a first application end of the at least one application end, encrypting, by the first security unit, a first session key with the first attribute key to open a first socket for connecting to the first application end; transmitting, by the first security unit, the encrypted first session key to the server; when the second security unit receives a request from the user end for accessing the first application end, transmitting, by the server, the encrypted first session key to the second security unit; and when the second security unit decrypts the encrypted first session key with the second attribute key, connecting, by the second security unit, to the socket in order to interchange information with the first security unit according to the first session key.

Accordingly, embodiments of present disclosure provide the transmission system and the transmission method with security mechanism. With present disclosure, security levels of existing transmission system can be improved.

BRIEF DESCRIPTION OF THE DRAWINGS

Present disclosure can be more fully understood by reading the following detailed description of the embodiment, with reference made to the accompanying drawings as follows:

FIG. 3A is a tree diagram illustrating the first attribute encryption logic of the first application end according to some embodiments of the present disclosure.

FIG. 3B is a tree diagram illustrating the second attribute encryption logic of the second application end according to some embodiments of the present disclosure.

FIG. 3C is a tree diagram illustrating the third attribute encryption logic of the third application end according to some embodiments of the present disclosure.

DETAILED DESCRIPTION

Figure 1:
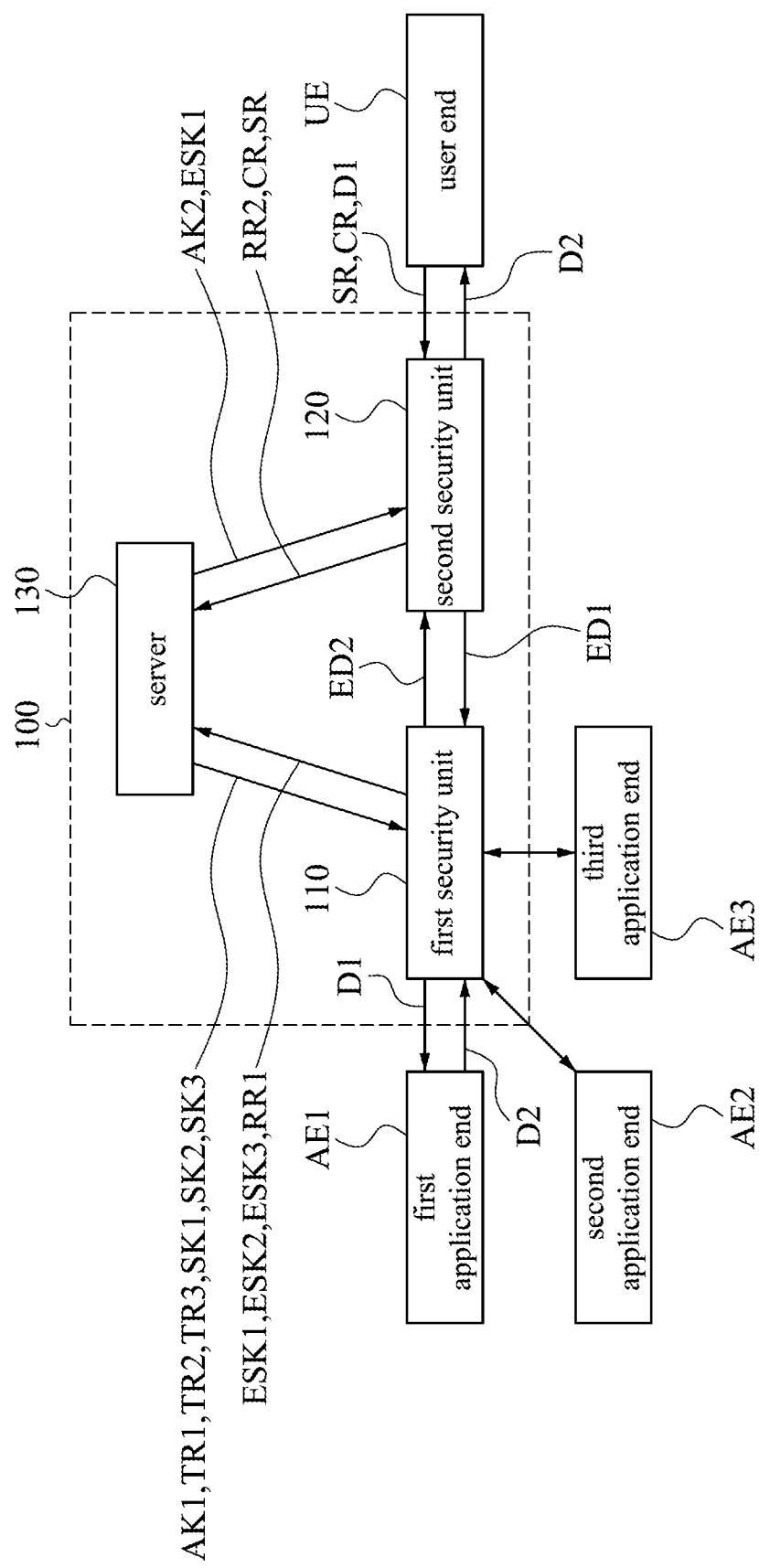
FIG. 1 is a schematic diagram of a transmission system according to some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

The terminology used herein is for the purpose of describing particular embodiments only and is not intended to be limiting of the disclosure. As used herein, the singular forms "a," "an," and "the" are intended to include the plural forms as well, unless the context clearly indicates otherwise.

In the following description and claims, the terms "coupled" and "connected", along with their derivatives, may be used. In particular embodiments, "connected" and "coupled" may be used to indicate that two or more elements are in direct physical or electrical contact with each other, or may also mean that two or more elements may be in indirect contact with each other. "Coupled" and "connected" may still be used to indicate that two or more elements cooperate or interact with each other.

As used herein, the terms "comprising," "including," "having," and the like are to be understood to be open-ended, i.e., to mean including but not limited to.

As used herein, the term "and/or" includes any and all combinations of one or more of the associated listed items.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

FIG. 1 is a schematic diagram of a transmission system according to some embodiments of the present disclosure. As shown in FIG. 1, in the embodiment, a transmission system 100 includes a first security unit 110, a second security unit 120 and a server 130. The first security unit 110 and the second security unit 120 are communicatively coupled to the server 130, respectively. It is noted that the phrase "communicatively coupling" here can be referred to as physically or non-physically coupling. For instance, the first security unit 110 and the second security unit 120 can be coupled to the server 130 via Wi-Fi, such that each of the first security unit 110 and the second security unit 120 can initiate bidirectional interchange of information with the server 130. Alternatively, the first security unit 110 and the second security unit 120 can be coupled to the server 130 via physical cables, such that each of the first security unit 110 and the second security unit 120 can apply bi-directional information interchange with the server 130.

It is noted that, in some embodiments, the first security unit 110 can be a security control device (or security control circuitry) installed with control software or control firmware, or the control software and control firmware of itself. The first security unit 110 can be communicatively coupled to a plurality of application ends. The application ends can be electric devices installed with control software or control firmware that are configured to collect information in some specific places. As shown in FIG. 1, in the embodiment, the first security unit 110 is communicatively coupled to a first application end AE1, a second application end AE2 and a third application end AE3. In some cases, the first application end AE1 can be a network camera settled in an office to capture image information in that office. The second application end AE2 can be a network camera settled in a material warehouse to capture image information in the warehouse. And, the third application end AE3 can be a temperature sensor settled in the same office to obtain temperature information in the office.

Similar to the first security unit 110, in some embodiments, the second security unit 120 can be a security control device (or security control circuitry) installed with control software or control firmware, or the control software and control firmware of itself. The second security unit 120 can be communicatively coupled to a user end that is installed with control software or control firmware. As shown in FIG. 1, in the embodiment, the second security unit 120 is communicatively coupled to a user end UE. The user end UE can provide information to a user who owns it.

In some embodiments, the first security unit 110 and the second security unit 120 may be implemented with one or more processors, microprocessors, digital signal processing circuitries, application-specific integrated circuitries, etc. The above implementations of the first security unit 110 and the second security unit 120 are given for illustrative purposes, and the first security unit 110 and the second security unit 120 can be applied with other applicable approaches.

As shown in FIG. 1, the server 130 of the transmission system 100 is configured to coordinate processes of data forwarding between the first security unit 110 and the second security unit 120. The server 130 at least includes a processor (not shown) and a memory (not shown). The processor can be, but not limited to, a single processing unit or an integration of a plurality of microprocessors that is/are electrically coupled to the memory. The memory can be volatile or non-volatile internal (or external) memories. The processor is configured to access at least one instruction from the memory and to execute the same, so as to perform processes corresponding to the at least one instruction. For better understandings of the operations of the server 130, the processes corresponding to the at least one instruction will be introduced in following paragraphs with reference to drawings.

It is noted that the transmission system 100 shown in FIG. 1 is given for illustrative purposes only, and the scope of present disclosure is not limited thereto. In some embodiments, the server 130 of the transmission system 100 can be coupled to more security units, in which each security unit can be communicatively coupled to a single or multiple application ends. In this case, the server 130 can coordinate processes of data forwarding among that security unit coupled to the user end and the security units coupled to the application ends.

Figure 2:
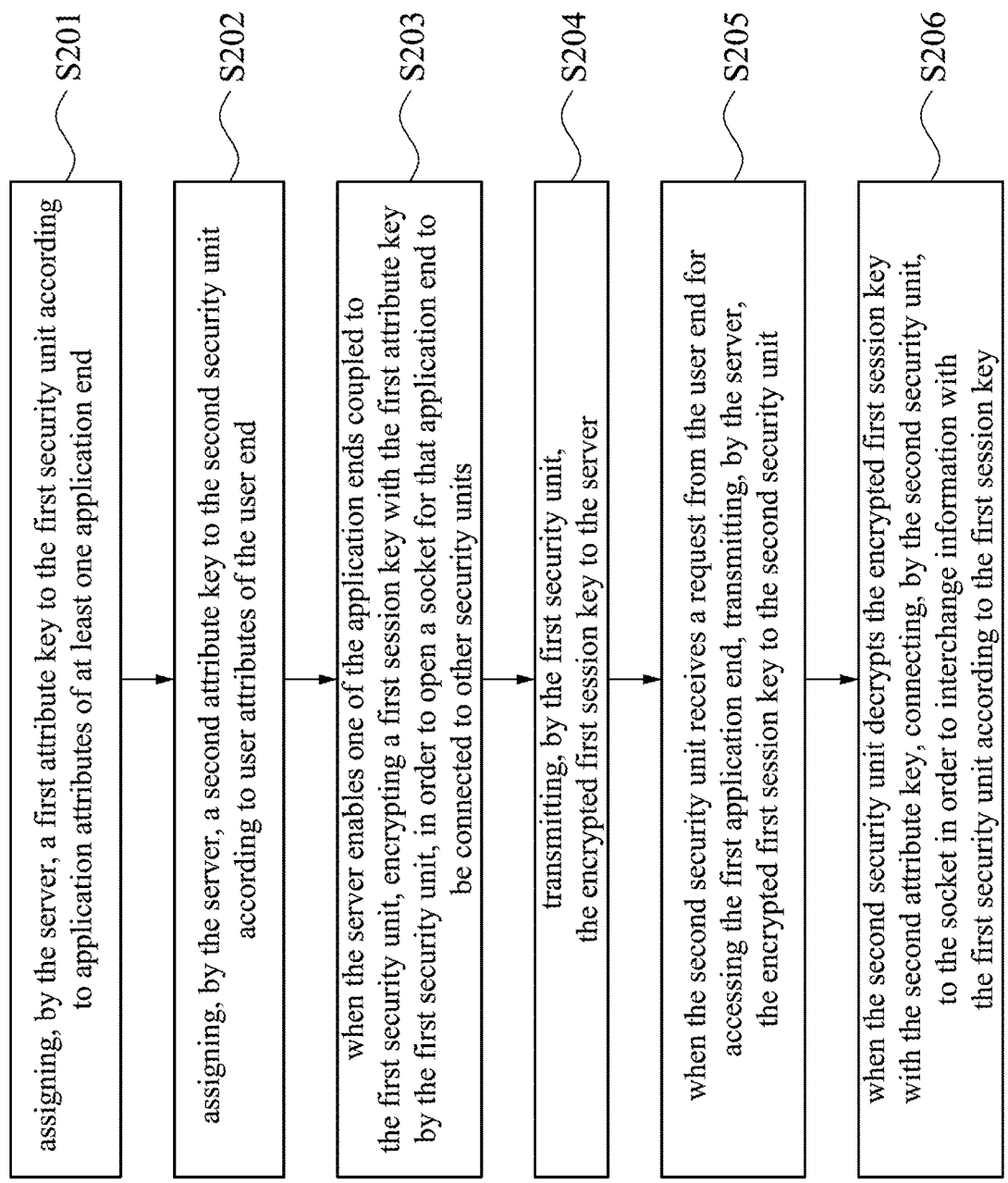
FIG. 2 is a flow chart of a transmission method according to some embodiments of the present disclosure.

FIG. 2 is a flow chart of a transmission method according to some embodiments of the present disclosure. In the embodiment, the transmission method is executed by the transmission system 100 shown in FIG. 1. In the embodiment, the detail steps of the transmission method will be described in following paragraphs.

In step S201: assigning, by the server, a first attribute key to the first security unit according to application attributes of at least one application end.

In some embodiments, the server 130 can generate a pair of private keys and a master key in advance. The first security unit 110 can send a registration request RR1 to the server 130, and the registration request RR1 includes confirmation information to which the first security unit 110 corresponds and also includes confirmation information corresponding to the application ends AE1-AE3 that are communicatively coupled to the first security unit 110. When the server 130 authorizes the registration request RR1, the server 130 can attach application attributes of the application ends AE1-AE3 onto one of the pair of private keys to generate a first attribute key AK1 with the master key. The server 130 then assigns the first attribute key AK1 to the first security unit 110.

It is noted that, as mentioned, the first attribute key AK1 assigned to the first security unit 110 is an ABE (Attribute-based Encryption) key. In particular, the first attribute key AK1 includes at least one attribute encryption logic. The attribute encryption logic is a combination logic of access permissions, which correspond to access permissions expected to be granted to the first to the third application ends AE1-AE3 respectively. For example, in some embodiments, since the first application end AE1 is the network camera in the office and the third application end AE3 is the temperature sensor in the same office, both of them can be corresponding to an application attribute named "office". In this case, the attribute encryption logics granted to the first application end AE1 and the third application end AE3 can be accessible to crews in that office. In some embodiments, since the second application end AE2 is the network camera in the material warehouse, the second application end AE2 can be corresponding to an application attribute named "material warehouse". In this case, the attribute encryption logics of the second application end AE2 can be accessible to crews in that material warehouse.

Moreover, in some embodiments, when the server 130 authorizes the registration request RR1 and assigns the first attribute key AK1 to the first security unit 110, the server 130 can store first registration information corresponding to the first security unit 110, in which the first registration information records a registration number of the first security unit 110, basic information of the first security unit 110, a relationship of the first attribute key AK1 and the first security unit 110, and the at least one attribute encryption logic of the first attribute key AK1.

In step S202: assigning, by the server, a second attribute key to the second security unit according to user attributes of the user end.

Similar to step S201, in some embodiments, the second security unit 120 can send a registration request RR2 to the server 130, and the registration request RR2 includes confirmation information corresponding to the second security unit 120 and confirmation information corresponding to the user end UE that communicatively coupled to the second security unit 120. When the server 130 authorizes the registration request RR2, with the master key, the server 130 can attach user attributes of the user end UE to another of the private key to generate a second attribute key AK2. The server 130 then assigns the second attribute key AK2 to the second security unit 120.

It is noted that the second attribute key AK2 assigned to the second security unit 120 is an ABE (Attribute-based Encryption) key. The second attribute key AK2 includes at least one attribute encryption logic. The attribute encryption logic is a logic combination of access permissions corresponding to the user end UE. For example, in some embodiments, since the user end UE is possessed by a manager of the office, who has a manager-level access permission of the office, the second attribute key AK2 being assigned to the user end UE at least corresponds to an application attribute named "office" and another application attribute named "manager".

Similarly, in some embodiments, when the server 130 authorized the registration request RR2 and assigned the second attribute key AK2 to the second security unit 120, the server 130 can store second registration information corresponding to the second security unit 120. The second registration information records a registration number of the second security unit 120, basic information of the second security unit 120, a relationship of the second attribute key AK2 and the second security unit 120, and the attribute encryption logic of the second attribute key AK2.

In step S203: when the server enables one of the application ends coupled to the first security unit, encrypting a first session key with the first attribute key by the first security unit, in order to open a socket for that application end to be connected to other security units.

In some embodiments, the server 130 can transmit a task request to enable one of the application ends coupled to the first security unit 110, which is one of the first application end AE1, the second application end AE2 and the third application end AE3. More specifically, since the server 130 can obtain basic information of the application ends AE1-AE3 from the registration information, the server 130 can try to enable any of the application ends AE1-AE3 via the task request.

For instance, in one embodiment, the server 130 can transmit a first task request TR1 to the first security unit 110 in order to enable the first application end AE1. In some embodiments, according to the first task request TR1, the first security unit 110 is requested to generate a first session key SK1 and encrypt the first session key SK1 with the attribute encryption logic corresponding to the first application end AE1 wrapped in the first attribute key AK1. For example, in one embodiment, a first attribute encryption logic corresponding to the first application end AE1 is wrapped in the first attribute key AK1. Reference can be made to FIG. 3A, which is a tree diagram illustrating the first attribute encryption logic of the first application end AE1.

As shown in FIG. 3A, a root node of the tree diagram corresponds to a "OR" determination logic. The left branch of the root node is corresponding to a single attribute node and the right branch of the root node is corresponding to another determination logic node. According to the "OR" determination logic of the root node, when any of the left and right branches is determined as "true", the root node outputs "true". Alternatively, when both of the left and right branches are determined as "false", the root node outputs "false". In the tree diagram, the attribute node on the left branch corresponds to attribute "office". In the tree diagram, the determination logic node on the right branch has three branches. When at least two of these branches are determined as "true", output of the determination logic node on the right branch is "true". As shown in figure, the attributes of the three branches, from left to right, are corresponding to attribute "manager", attribute "worked for at least 5 years", and attribute "maintenance team", respectively. According to the tree diagram, for example, when a decryption attribute matches to attribute "office, the output of the tree diagram is "true". When decryption attributes match to any two of the attributes "manager", "worked for at least 5 years", and "maintenance team", the root node can output "true". Otherwise, the root node outputs "false".

In some embodiments, when the first security unit 110 encrypts the first session key SK1 with the attribute encryption logic corresponding to the first application end AE1 wrapped in the first attribute key AK1, the first security unit 110 opens a first session socket. Accordingly, other security units can connect to the first application end AE1 via the first session socket. so as to exchange information with the first application end AE1. In this case, the first security unit 110 completes the first task request TR1 sent from the server 130.

For instance, in one embodiment, the server 130 can transmit a second task request TR2 to the first security unit 110 in order to enable the second application end AE2. In some embodiments, the second task request TR2 is for requesting the first security unit 110 to generate a second session key SK2 and to encrypt the second session key SK2 with the attribute encryption logic corresponding to the second application end AE2 wrapped in the first attribute key AK1. For example, in one embodiment, a second attribute encryption logic corresponding to the second application end AE2 is wrapped in the first attribute key AK1. Reference can be made to FIG. 3B, which is a tree diagram illustrating the second attribute encryption logic of the second application end AE2.

As shown in FIG. 3B, which is similar to FIG. 3A, the tree diagram has a root node. The root node also corresponds to a "OR" determination logic. The left branch of the root node is corresponding to a single attribute node and the right branch of the root node is corresponding to another determination logic node. In the tree diagram, the attribute node on the left branch corresponds to attribute "material warehouse". In the tree diagram, the determination logic node corresponds to a "OR" determination logic and has two branches corresponding to attribute "maintenance team" and attribute "security team" respectively. About the determination of the outputs of the root node, reference can be made to the embodiment of FIG. 3A.

Similarly, when the first security unit 110 encrypts the second session key SK2 with the attribute encryption logic corresponding to the second application end AE2 wrapped in the first attribute key AK1, the first security unit 110 can open a second session socket for the second application end AE2. Information exchanges with the second application end AE2 can be made via that second session socket. In this case, the first security unit 110 completes the second task request TR2 sent from the server 130.

In the same manner, in the embodiment, the server 130 can transmit a third task request TR3 to the first security unit 110 in order to enable the third application end AE3. In some embodiments, according to the third task request TR3, the first security unit 110 is requested to generate a third session key SK3 and encrypt the third session key SK3 with the attribute encryption logic corresponding to the third application end AE3 wrapped in the first attribute key AK1. Thus, the encrypted third session key ESK3 can be generated.

Accordingly, the first security unit 110 can open a third session socket for the third application end AE3 to complete the third task request TR3. Reference can be made to FIG. 3C, which is a tree diagram illustrating the third attribute encryption logic of the third application end AE3.

As shown in FIG. 3C, the tree diagram is similar to the embodiments of FIG. 3A and FIG. 3B. The tree diagram has a root node corresponding to a "OR" determination logic. Each of the left branch and the right branch of the root node is corresponding to a determination logic node. In the tree diagram, each determination logic node on the left branch and the right branch is corresponding to a "AND" determination logic. Accordingly, these determination logic nodes can output "true" only when all the branches of the determination logic node are determined as "true". In the tree diagram, the determination logic node on the left branch has two branches corresponding to attribute "office" and attribute "manager" respectively. In the tree diagram, the determination logic node on the right branch has two branches corresponding to attribute "environmental engineer team" and attribute "worked for at least 5 years". According to the tree diagram, for instance, when both of the attribute "office" and attribute "manager" are applied as decryption attributes, the output of left determination logic node is "true". When both of the attribute "environmental engineer team" and attribute "worked for at least 5 years" are applied as decryption attributes, the output of right determination logic node is "true". According to determination logic of the root node, when at least one of the left and right branches is "true", the root node outputs "true". Otherwise, the root node outputs "false".

It is noted that the tree diagrams shown in FIG. 3A-3C are given for purpose of illustrating the determination logics of the first attribute key AK1 but not to limit present disclosure. It should be understood that the attribute encryption logics of the first attribute key AK1 may include other available ABE structures with more layers or determination logics. In the same manner, based on use demands, the first attribute key AK1 can include available attributes other than shown in the embodiment for decryptions.

In step S204: transmitting, by the first security unit, the encrypted first session key to the server.

In some embodiments, when the first security unit 110 completes the first to the third task request TR1-TR3 requested by the server 130, the first security unit 110 can transmit the encrypted first session key ESK1, the encrypted second session key ESK2 or the encrypted third session key ESK3 to the server 130 in response to the completions of the task requests TR1-TR3.

In some embodiments, the server 130 can store the encrypted first session key ESK1, the encrypted second session key ESK2 and the encrypted third session key ESK3 to generate an application table. The application table records information of the first application end AE1, the second application end AE2 or the third application end AE3. For better understandings, reference can be made to following Table 1 that illustrates an application table according to some embodiments of present disclosure.

TABLE 1

| | Registration No. | | |
|---|---|---|---|
| | 1 | 2 | 3 |
| Name | Office Image Camera | Warehouse Image Camera | Office Temperature Sensor |
| Application Type | | | |
| Attribute Encryption Logic | First Encryption Logic | Second Encryption Logic | Third Encryption Logic |
| Security Unit No. | 110 | 110 | 110 |
| Security Unit IP | 10.172.0.5 | 10.172.0.5 | 10.172.0.5 |
| Session Socket | 8080 | 8081 | 8080 |
| Protocol | RTSP/HTTP | MQTT | RTSP/HTTP |

As shown in Table 1, for example, in one embodiment, a first record corresponding to the first application end AE1 includes: basic information of the first application end AE1 (Registration No., Name, Application Type), the attribute encryption Logics of the first application end AE1, the number of the first security unit 110, the IP (Internet protocol) address of the first security unit 110, the session socket corresponding to the first application end AE1, protocol type of the first application end AE1, etc. In addition, a second record corresponding to the second application end AE2 and a third record corresponding to the third application end AE are listed in Table 1 as well.

It is noted that the application table as Table 1 and the records listed in Table 1 are merely examples but not to limit present disclosure. It is understood that the records and information stored in the application table can be different in other embodiments.

In step S205: when the second security unit receives a request from the user end for accessing the first application end, transmitting, by the server, the encrypted first session key to the second security unit.

In some embodiments, the user end UE can send a service confirmation request SR to the server 130 via the second security unit 120, in which the service confirmation request SR is a query about enabled application ends that the server 130 handled. For example, in some embodiments, the second security unit 120 can redirect the service confirmation request SR to the server 130, and the service confirmation request SR includes the number of the second security unit 120. When the server 130 receives the service confirmation request SR, the server 130 can access the second registration information according to the number of the second security unit 120 and obtain the decryption attributes of the second attribute key AK2. In this case, the server 130 can determine the access permissions of the second security unit 120 accordingly.

In some embodiments, the server 130 can determine whether to transmit parts of the records on the application table to the second security unit 120 based on the access permissions of the second security unit 120. For instance, in some embodiments, the second attribute key AK2 corresponding to the user end UE wraps decryption attribute "office". According to the application table, the server 130 can determine that the access permissions of the user end UE at least matched to the attribute encryption Logics of the first application end AE1 and the third application end AE3. Therefore, the server 130 can send the first record (corresponding to the first application end AE1) and the third record (corresponding to the third application end AE3) in the application table to the second security unit 120.

In some embodiments, when the second security unit 120 receives the first record and the third record in the application table, the user end UE coupled to the second security unit 120 can choose the first application end AE1 as target of connection according to the first record or choose the third application end AE3 as target of connection according to the third record. For example, in one embodiment, the user end UE can send a connection request CR for accessing the first application end AE1 to the second security unit 120, and the second security unit 120 can attach the number of itself (i.e. the second security unit 120) onto the connection request CR then transmit the connection request CR to the server 130.

In some embodiments, when the server 130 receives the connection request CR, the server 130 can authenticate the access permissions of the second security unit 120 based on the number of the second security unit 120. Once the authentication is done, the server 130 can transmit the encrypted first session key ESK1 to the second security unit 120.

In step S206: when the second security unit decrypts the encrypted first session key with the second attribute key, connecting, by the second security unit, to the socket in order to interchange information with the first security unit according to the first session key.

In some embodiments, when the second security unit 120 receives the encrypted first session key ESK1, the second security unit 120 can try to decrypt the encrypted first session key ESK1 with the second attribute key AK2. As mentioned, in some embodiments, the first session key SK1 was encrypted according to the attribute encryption logic corresponding to the first application end AE1, as shown in FIG. 3A. As the second attribute key AK2 has decryption attributes "office" and "manager", it is matched to the attribute encryption logic of the first application end AE1 in part, as shown in FIG. 3A (e.g. attribute "office" is matched to the left branch of the tree diagram in FIG. 3A, the output is "true"). In this case, the first security unit 110 can decrypt the encrypted first session key ESK1 with the second attribute key AK2 successfully. It is noted that, if the encrypted first session key ESK1 is obtained by another user end of the second security unit 120, the user end cannot decrypt the encrypted first session key ESK1 unless it owned a key match to the attribute encryption logic shown in FIG. 3A.

In some embodiments, once the second security unit 120 decrypt the encrypted first session key ESK1 with the second attribute key AK2 successfully, the second security unit 120 can connect to the first session socket of the first security unit 110, then the user end UE can forward data to the first application end AE1. It is noted that the session of the user end UE and the first application end AE1 is based on encrypted bi-directional information exchange. More specifically, in some embodiments, the user end UE can send first information D1 (e.g. a video stream request) to the second security unit 120, and the second security unit 120 can encrypt the first information D1 with the first session key SK1 and transmit the encrypted first information ED1 to the first security unit 110 via the first session socket. The first security unit 110 can receive the encrypted first information ED1 and decrypt the encrypted first information ED1 with the first session key SK1, then transmit the decrypted first information D1 to the first application end AE1. Similarly, when the first application end AE1 transmit second information D2 (e.g. video stream contents) to the first security unit 110, the second information D2 can be encrypted as encrypted second information ED2 according to the first session key SK1. The encrypted second information ED2 can be transmitted to the second security unit 120 via the first session socket. The second security unit 120 can decrypt the encrypted second information ED2 with the first session key SK1 and transmit the decrypted second information D2 to the user end UE.

In foregoing embodiments, as the first application end AE1 is the network camera settled in the office, the user end UE can obtain image information in the office. Moreover, data forwarding processes between the user end UE and the first application end AE1 are further secured by the association of first security unit 110 and the second security unit 120. In present disclosure, a highly-secured data transmission system and a method thereof are provided.

In the same manner, as the second security unit 120 corresponds to access permissions of "office" and "manager", thus the second attribute key AK2 can have decryption attributes "office" and "manager". When the user end UE tries to connect to the third application end AE3, similar process as above can be performed. Temperature information obtained by the third application end AE3 can be accessed with the second attribute key AK2 (e.g. attributes "office" and "manager" are matched to the left branch of the tree diagram in FIG. 3C, the output is "true").

According to foregoing embodiments, present disclosure can bring benefits as follows. The server 130 of present disclosure can authenticate access permissions of the user end UE and decide whether to transmit records in the application table to the second security unit 120. The above operation establishes a first security mechanism. Furthermore, the partial corresponding relation between the session key and the decryption key establishes a second security mechanism. With these two security mechanisms, the system and method of present disclosure provide a high-level transmission security.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A transmission system with security mechanism, comprising:
   a first security unit, coupled to at least one application end;
   a second security unit, coupled to a user end; and
   a server, coupled to the first security unit and the second security unit, in which the server is configured to assign a first attribute key to the first security unit according to at least one application attribute of the at least one application end and assign a second attribute key to the second security unit according to a user attribute of the user end, wherein the server enables a first application end of the at least one application end, and the first security unit encrypts a first session key with the first attribute key and opens a first socket for connecting to the first application end, the first security unit then transmits the encrypted first session key to the server, wherein the second security unit receives a request from the user end for accessing the first application end, and the server transmits the encrypted first session key to the second security unit, wherein the second security unit decrypts the encrypted first session key with the second attribute key to connect the first socket, in order to interchange information with the first security unit according to the first session key, wherein the server further enables a second application end of the at least one application end, and the first security unit encrypts a second session key with the first attribute key and opens a second socket for connecting to the second application end, the first security unit then transmits the encrypted second session key to the server, and the server generates an application table associated with the at least one application end, and the application table includes a first record corresponding to the first application end and a second record corresponding to the second application end.

2. The transmission system of claim 1, wherein the second security unit decrypts the encrypted first session key with the second attribute key if the user attribute matches to the at least one application attribute.

3. The transmission system of claim 1, wherein if the second security unit receives a service confirmation request which is sent from the user end to the server, the server determines whether to transmit at least one of the first record and the second record in the application table to the second security unit according to the user attribute.

4. The transmission system of claim 1, wherein the first attribute key and the second attribute key are Attribute-based Encryption (ABE) keys.

5. A transmission method with security mechanism, applied on a first security unit, a second security unit and a server, wherein the first security unit is coupled to at least one application end, the second security unit is coupled to a user end, and the server is coupled to the first security unit and the second security unit, and the transmission method comprising:

assigning, by the server, a first attribute key to the first security unit according to at least one application attribute of the at least one application end;

assigning, by the server, a second attribute key to the second security unit according to a user attribute of the user end;

when the server enables a first application end of the at least one application end, encrypting, by the first security unit, a first session key with the first attribute key to open a first socket for connecting to the first application end;

transmitting, by the first security unit, the encrypted first session key to the server;

when the second security unit receives a request from the user end for accessing the first application end, transmitting, by the server, the encrypted first session key to the second security unit;

when the second security unit decrypts the encrypted first session key with the second attribute key, connecting, by the second security unit, to the socket in order to interchange information with the first security unit according to the first session key; and wherein when the server enables a second application end of the at least one application end, encrypting, by the first security unit, a second session key with the first attribute key to open a second socket for connecting to the second application end;

transmitting, by the first security unit, the encrypted second session key to the server; and generating, by the server, an application table associated with to the at least one application end, wherein the application table includes a first record corresponding to the first application end and a second record corresponding to the second application end.

6. The transmission method of claim 5, wherein the second security unit decrypts the encrypted first session key with the second attribute key if the user attribute matches to the at least one application attribute.

7. The transmission method of claim 5, further comprising:

if the second security unit receives a service confirmation request which is sent from the user end to the server, determining, by the server, whether to transmit at least one of the first record and the second record in the application table to the second security unit according to the user attribute.

8. The transmission method of claim 5, wherein the first attribute key and the second attribute key are Attribute-based Encryption (ABE) keys.

* * * * *